(No Model.)
E. G. KEMPER.
STONE SAW.
No. 439,247.　　　　　　　　Patented Oct. 28, 1890.
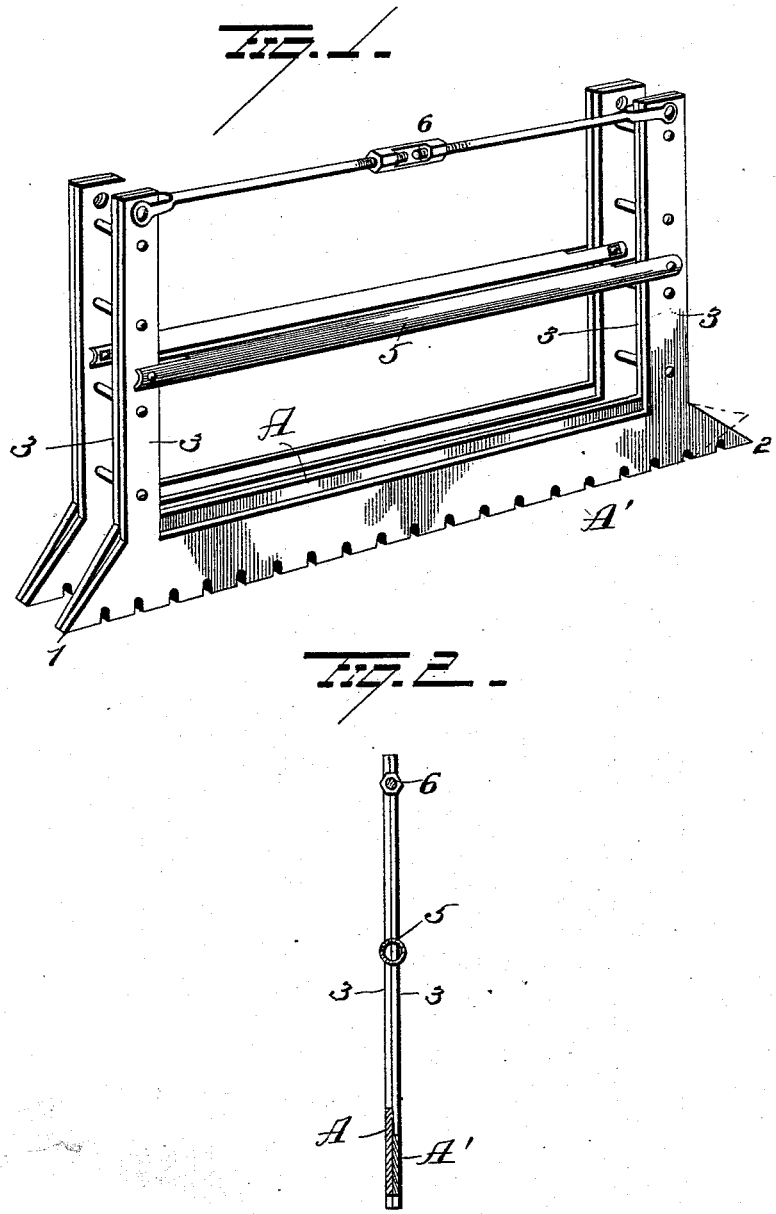
Witnesses
Inventor
E. G. Kemper.
By his Attorney

UNITED STATES PATENT OFFICE.

ERNEST G. KEMPER, OF BURLINGTON, IOWA.

STONE-SAW.

SPECIFICATION forming part of Letters Patent No. 439,247, dated October 28, 1890.

Application filed April 25, 1890. Serial No. 349,510. (No model.)

*To all whom it may concern:*

Be it known that I, ERNEST G. KEMPER, a resident of Burlington, in the county of Des Moines and State of Iowa, have invented certain new and useful Improvements in Stone-Saws; and I do hereby declare the following to be a full, clear, and exact description of the invention, such as will enable others skilled in the art to which it appertains to make and use the same.

My invention relates to an improvement in stone-saws, the object being to provide means whereby the entire saw-blade may be utilized notwithstanding that the edge becomes worn and ground off by the frictional contact of the blade with the material being sawed.

With these ends in view my invention consists in a double blade and devices for bracing and tightening the blade.

It further consists in certain novel features of construction and combinations of parts, as will be hereinafter described, and pointed out in the claims.

In the accompanying drawings, Figure 1 is a view in perspective of a gang of saws, and Fig. 2 is a sectional view.

A A' represent the leaves or members comprising the saw. These are pointed at both ends 1 and 2, and riveted securely together to constitute one stiff and rigid saw. The leaves or members A and A' are of different widths, and preferably the same thickness. The object of employing blades of different widths is to insure utilizing the entire blade, for in this way one leaf is worn out before the other, and a new one may be riveted on in front just as soon as one is worn out. A guide-plate 3 projects at right angles from the ends of the blades, and these guide-plates are integral with or rigidly secured to the blades. These guide-plates are connected about midway of their length by a section of ordinary piping 5, which preferably is movably secured to the guide-plates, and at the upper ends a tension rod or screw 6 connects the guide-plates and admits of the blades being tightened or loosened.

The various saws are connected in gangs of about a half dozen, as occasion may require, by means of pipes or other convenient devices, and they are usually suspended on wire ropes, (not shown,) and power is communicated from one end.

It is evident that slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. A saw composed of two or more leaves or members of different widths rigidly secured together side by side, each leaf or member having a cutting edge, substantially as set forth.

2. A stone-saw composed of two or more leaves or members of different widths rigidly secured together side by side, each leaf or member having a cutting-edge and provided with a guide-plate at one or both ends, substantially as set forth.

3. A stone-saw composed of two or more blades of different widths rigidly secured together side by side, each provided with a cutting-edge and with a guide-plate, a brace between the guide-plates, and means for regulating the tension of the blades, substantially as set forth.

In testimony whereof I have signed this specification in the presence of two subscribing witnesses.

ERNEST G. KEMPER.

Witnesses:
  HENRY DRAEGEMEYER,
  ED. H. BORSCH.